(12) United States Patent
Betz et al.

(10) Patent No.: US 10,085,460 B2
(45) Date of Patent: Oct. 2, 2018

(54) METHOD AND DEVICE FOR FILLING OF SAUSAGE SLEEVES

(71) Applicant: ALBERT HANDTMANN MASCHINENFABRIK GMBH & CO. KG, Biberach (DE)

(72) Inventors: Andreas Betz, Baustetten (DE); Manfred Baechtle, Schemmerhofen (DE); Gerhard Schliesser, Wain (DE); Christian Restle, Birkenhard (DE); Florian Osswald, Ulm (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 99 days.

(21) Appl. No.: 15/371,059

(22) Filed: Dec. 6, 2016

(65) Prior Publication Data

US 2017/0156353 A1   Jun. 8, 2017

(30) Foreign Application Priority Data

Dec. 7, 2015   (EP) .................................... 15198179

(51) Int. Cl.
*A22C 11/00*   (2006.01)
*A22C 11/02*   (2006.01)

(52) U.S. Cl.
CPC .......... *A22C 11/02* (2013.01); *A22C 11/0209* (2013.01)

(58) Field of Classification Search
CPC ..... A22C 11/00; A22C 11/001; A22C 11/005; A22C 11/02; A22C 11/0209; A22C 11/0227; A22C 11/0245

USPC ....................... 452/30–32, 35–37, 46–48, 51
See application file for complete search history.

(56) References Cited

U.S. PATENT DOCUMENTS

| | | | |
|---|---|---|---|
| 3,860,996 A | 1/1975 | Kupcikevicius et al. | |
| 3,890,675 A | 6/1975 | Nausedas | |
| 3,975,795 A | 8/1976 | Kupcikevicius et al. | |
| 4,044,425 A | 8/1977 | Nausedas | |
| 4,419,790 A | 12/1983 | Niedecker | |
| 6,669,545 B1 * | 12/2003 | Hergott | A22C 11/0245 452/33 |
| 7,442,117 B2 * | 10/2008 | Kruse | A22C 11/0209 452/31 |
| 7,513,821 B2 * | 4/2009 | Waldstadt | A22C 11/0209 452/45 |

(Continued)

FOREIGN PATENT DOCUMENTS

| | | |
|---|---|---|
| DE | 2402361 A1 | 8/1974 |
| DE | 2437562 A1 | 2/1975 |

(Continued)

OTHER PUBLICATIONS

Japanese Patent Office, Office Action Issued in Application No. 2016209916, dated Oct. 3, 2017, 8 pages.

*Primary Examiner* — Richard Thomas Price, Jr.
(74) *Attorney, Agent, or Firm* — McCoy Russell LLP

(57) ABSTRACT

The present disclosure relates to a method and a device for filling of sausage sleeves with pasty material through a filling tube, wherein the pasty material is fed in the filling tube through an opening on its rear end in the axial direction. At the end of the filling process, the filling tube is moved back out of its filling position in the axial direction onto an axially arranged closing element, wherein the opening is closed.

20 Claims, 5 Drawing Sheets

(56) References Cited

U.S. PATENT DOCUMENTS

| | | | | |
|---|---|---|---|---|
| 7,520,801 B2 * | 4/2009 | Epstein | ................ | A22C 7/0023 |
| | | | | 452/30 |
| 7,604,531 B2 * | 10/2009 | Hanten | ................ | A22C 11/125 |
| | | | | 452/48 |
| 7,704,130 B2 * | 4/2010 | Hanten | .............. | A22C 11/0263 |
| | | | | 452/32 |
| 7,914,364 B2 * | 3/2011 | Mysker | .............. | A22C 11/0209 |
| | | | | 452/32 |
| 8,137,167 B2 * | 3/2012 | Baechtle | ............ | A22C 11/0218 |
| | | | | 452/36 |
| 8,308,533 B2 * | 11/2012 | Haslacher | .............. | A22C 11/00 |
| | | | | 452/32 |
| 8,777,703 B1 * | 7/2014 | Herron | ................... | A22B 5/161 |
| | | | | 452/128 |

FOREIGN PATENT DOCUMENTS

| | | | |
|---|---|---|---|
| DE | 2741291 | A1 | 3/1978 |
| DE | 2660519 | C2 | 4/1983 |
| EP | 0031607 | A1 | 7/1981 |
| EP | 0743254 | A1 | 11/1996 |
| JP | H0937707 | A2 | 2/1997 |

\* cited by examiner

METHOD AND DEVICE FOR FILLING OF SAUSAGE SLEEVES

CROSS-REFERENCE TO RELATED APPLICATIONS

The present application claims priority to European Patent Application No. 15 198 179.2, entitled "METHOD AND DEVICE FOR FILLING OF SAUSAGE SLEEVES," filed Dec. 7, 2015. The entire contents of the above-cited application are hereby incorporated by reference for all purposes.

TECHNICAL FIELD

The present disclosure relates to a method and a device for filling of sausage sleeves with pasty material.

BACKGROUND AND SUMMARY

Sausages filled with pasty material are produced by means of filling machines in which the pasty material is at first filled into a funnel, conveyed via a conveyor system into a filling tube and discharged by the filling tube into a sausage sleeve. During the filling process, the filling material is under pressure and compressed. When the filling process is ended, e.g. when a new sausage sleeve is put onto the filling tube, the filling material that remains in the filling material intake (between the conveyor system and the end of the filling tube) is relieved due to the air content in the filling material, which amounts to approximately 0.5 to 10%. As the filling material cannot expand towards the conveyor system, this filling material expansion leads to escaping of a part of the filling material on the open filling tube end. This effect is undesired as, on one hand, the escaped filling material can moisten and therefore damage sensitive sausage sleeves and as there might be split skins during production on the other hand. Further, escaping filling material leads to weight inaccuracies of the first portion(s) of a subsequent skin roller. The escaped filling material cannot be fed into the filling process anymore and is consequently lost. Another disadvantage consists in that this filling material soils the machine during production. However, filling material can also escape due to viscosity. For example, the filling material may escape due to a low viscosity of the filling material.

Based on this, the underlying purpose of the present disclosure is to provide a method and a device to prevent or at least to minimize the escape of filling material at the end of the filling tube when finishing the filling process.

In the method according to the present disclosure for filling of sausage sleeves with pasty material through a filling tube, the pasty material is fed into the filling tube through an opening on its rear end in the axial direction. At the end of the filling process, the filling tube is driven out of its filling position back to an axially arranged closing element in the axial direction, whereby the opening is closed. Hence, the flow of pasty material can be locked towards the filling tube. Hence, the expanding air in the filling material cannot push the filling material through the filling tube towards the outside anymore. Only the filling material that is located in the filling tube can still expand towards the end of the filling tube. According to the present disclosure, the pasty material can arrive in the filling tube without deflection or without any major cross-section constriction during the filling process. The pasty material thereby flows simply in the feeding device around the closing element into the filling tube. In case of the solution, the pressure of the pasty material does not have to open the throughput cross-section against an outside energy (e.g. spring) as it would be the case for example if a check valve were used. If, at the end of the filling process, the filling tube is pushed axially to the rear, i.e. against the transport direction of the pasty material, the filling tube can for example be pulled out of a skin brake to put on a new sausage sleeve without a swiveling process and hence a complex mechanism being required. The filling tube can be closed in a fast and simple way after the filling process. Then, the filling tube can be moved again from an end position to the filling position to the front. For example, the filling tube may be moved axially in a direction opposite of the end position in order to be moved to a front position.

According to one embodiment, the filling tube and the closing element will be displaced together over a second path S2 in the axial direction to the rear into an end position after having moved the filling tube over a first path S1 onto the closing element and therefore having closed the opening. This means that, if the filling tube is for example moved to the rear in the axial direction for putting on a new sausage sleeve, the opening will already be closed towards the rear during a part of the way so that no pasty material can enter the filling tube anymore. Therefore, the filling tube opening and hence the flow of the pasty material into the filling tube will already be locked after a short movement path. It will be particularly advantageous if the second path S2≥the first path S1.

It will be advantageous if the filling tube and the closing device are connected to one another via a holding device in a way that the opening also remains closed during the joint movement of the filling tube and the closing element. Particularly easy to implement is a respective connection via a magnetic holding device, wherein the closing element sticks to the filling tube due to magnetic force. However, other detachable holding devices such as snap devices are also possible.

Advantageously, it is provided that the filling tube will again be moved away from the closing element into a filling position, for example after having been closed and after a new sausage sleeve has been put on. The closing element and the filling tube may be moved jointly out of the end position in the opposite axial direction back to the front. In this process the closing element and the filling tube are still connected to one another through the holding device. Before the filling tube is arranged in the filling position again, the opening of the filling tube is opened again while the closing element and the filling tube are moving apart. In one example, the opening is opened after a path that is equivalent to the second path S2.

After being moved over the second path S2 in an axial direction towards the front, the closing element may be stopped once again. In at least one embodiment, the closing element reaches the end stop in this process. As the filling tube is moved further towards the front, the connection, e.g. magnetic connection, between the filling tube and the closing element is detached so that the opening is uncovered. The filling tube is subsequently put back into its filling position. If the closing element is for example kept in the end stop position by means of the further holding device, in particular by magnetic force, it can be avoided that the closing element is pulled and/or sucked back towards the conveyor system in a backsiphoning process of a conveyor system.

At the end of the filling process means for example that the filling tube moves back out of the filling position in the axial direction A when a conveyor system for feeding of the filling tube with pasty material is switched off. After the switch-off, the conveyor system can move in a backward direction to suck off potential remainders in a feeding device that is adjacent to the conveyor system and to compensate the reduction of the filling material volume as a consequence of the axial movement. The closing element, that has for example an elongated shape, e.g. has an elongated plunger, may be led in a guiding system during its axial movement. The closing element can be moved and/or driven through the filling tube and/or moved via a separate drive and/or for example by means of spring energy. If the closing element is moved through the filling tube, a respective device can be set up in a particularly simple and cost-efficient way.

In some applications, the filling tube can comprise for example a filling material feed tube as well as an axially arranged, detachable filling tube front section, wherein the front filling tube section is detached in the end position and wherein the front opening of the filling material feeding tube may be closed.

Therefore, for example the filling tube front section can be replaced, for example by turning the front filling tube section away via a turning system and by replacing it by a new filling tube section.

A device according to the present disclosure for filling of sausage sleeves with pasty material is provided. The device comprises a filling tube that is arranged in an axially movable way and a feeding device through which the pasty material can be fed in axially from a conveyor system on an opening at the rear end of the filling tube. According to the present disclosure, an axially arranged closing element may be provided by means of which the opening at the end of the filling tube can be closed if the filling tube is moved onto the closing element. In this process, the device can have a drive that can move the filling tube axially back and forth.

Thereby, the closing element may be arranged in an axially movable way in the feeding device, in particular as an axially movable plunger whose front end closes the filling tube opening.

The filling tube and the closing element can be moved jointly in the axial direction to the rear into an end position. The filling tube can be connected to the closing element by means of a holding device, in particular of a magnetic holding device that can be provided easily and cost-efficiently. In at least one example, the axial movement of the closing element to the front is limited by a first stop device, in particular an end stop, wherein the closing element is held in the end stop position, for example, by a further holding device, in particular by a magnetic holding device. This end stop enables the filling tube to move further to the front whereas the closing element is stopped so that the filling tube and the closing element can move apart and that the opening at the rear end of the filling tube can be opened once again. The holding device ensures that the closing element will not be pulled to the rear during a backsiphoning process of the pump.

The filling pipe and/or the closing element are held in the end position by a second stop device, in particular a second end stop. If the closing element runs onto the first or second end stop, the filling tube can be positioned correctly in its filling position and end position by means of the closing element in a simple way.

BRIEF DESCRIPTION OF THE FIGURES

The feeding device disclosed herein may be connected to the outlet of a conveyor system. The present disclosure will be explained in greater detail below with reference to the following Figures.

DETAILED DESCRIPTION

Figure 5:
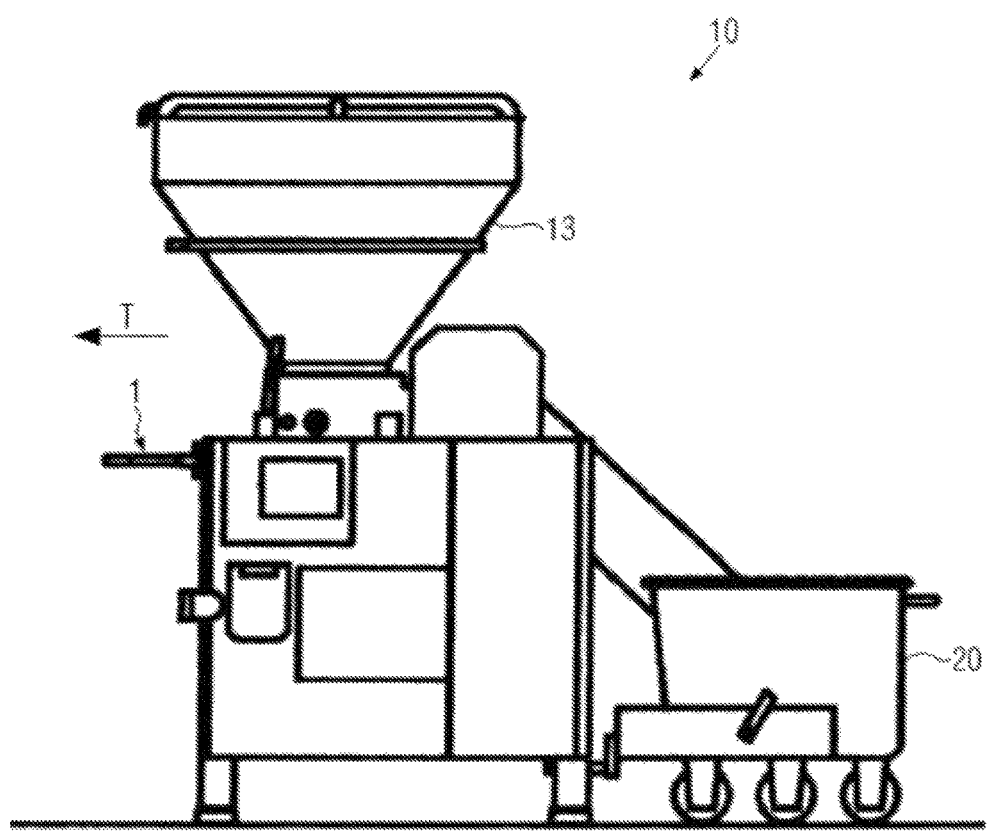
FIG. 5 shows a roughly schematic illustration of a filling machine according to the present disclosure.

FIG. 5 shows a roughly schematic illustration of a filling machine according to the present disclosure. The filling machine 10 has a funnel 13 for the intake of pasty material, i.e. of pasty foodstuff such as in particular sausage meat or other food paste etc.

The pasty food can for example be lifted via a meat trolley 20 and a respective lifting device and poured into the funnel. Below the funnel, there is a conveyor system 7 that is not shown, in particular a vane pump that pushes the pasty material into a filling tube 1 as will be described in the following. The filling tube 1 ejects the pasty material e.g. into a sausage sleeve or the sausage sleeve is coextruded.

Figure 1:
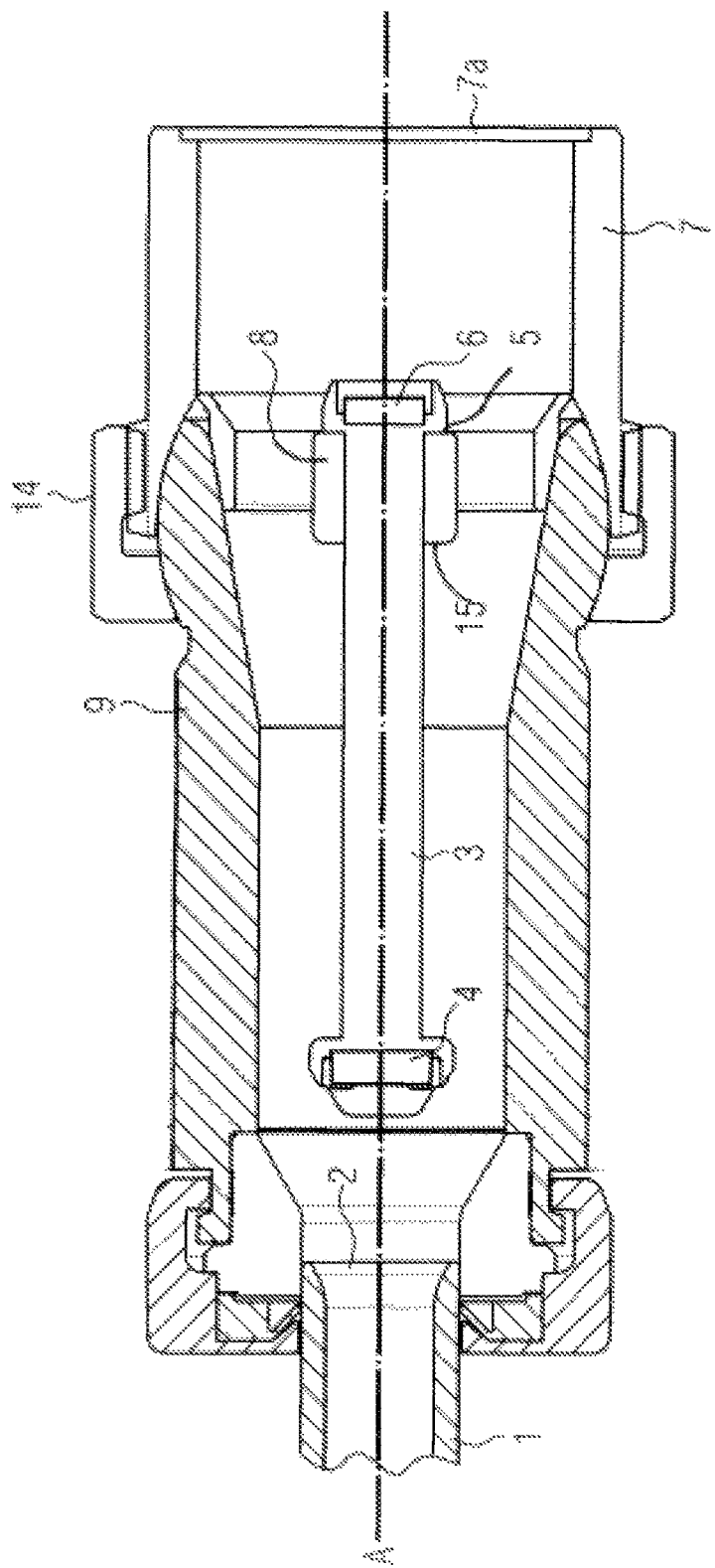
FIG. 1 shows a roughly schematic section through a device according to the present disclosure in a filling position.

FIG. 1 shows the outlet 7a of the conveyor system 7 that is connected to the filling tube 1 via a feeding device 9. The feeding device 9 is for example formed in a tube-shaped way and has a larger diameter than the filling tube 1. The feeding device 9 is connected in a pressure-tight way to the conveyor system 7 by a support device 14. On the front end, e.g. the end of the feeding device 9 that faces away from the conveyor system 7, the filling tube 1 is axially movable and inserted in an outward-sealed way. Further, a closing element 3 that is also axially movable is disposed on the inside of the feeding device 9. Here, the closing element 3 is formed as an elongated plunger that has a front section that is formed in a way that it can close an opening 2 of the filling tube 1 through which the pasty material can be fed in the axial direction A. In this context, for example the outer contour of the front area of the closing element is formed in a way, e.g. conically, that it closes up with the inner contour, which is formed for example complementarily to it. The closing element 3 can thereby have a holding device 4, in particular a magnetic holding device that connects the filling tube 1 and the closing element 3 to one another by means of magnetic force. In this embodiment, the closing element 3 is installed in an axially movable way in the guiding element 8. The guiding element 8 is fixed within the feeding device 9 and has extensive openings, e.g. kidney-shaped openings for the throughput of the pasty material in the plane that is perpendicular to the plane shown in FIG. 1, i.e. perpendicular to the axis A. Hence, the pasty material can flow through the feeding device 9 around the closing element 3 in the direction of the filling tube 1 and fill this filling tube in the axial direction A.

The rear section of the elongated closing element, here the plunger 3, is located behind the guiding element 8 and also has a larger cross-section in the end area and can also have a second holding device 6 in this area, e.g. in form of a magnetic holding device, that holds the plunger on the guiding 8 by magnetic force. The front section as well as the rear section of the closing element 3 have each a larger diameter than the central area of the closing element 3 in a way that the front and rear section can respectively run up to the end stop 5 and/or 15 of the guiding element 8 during the axial movement. Hence, the front and rear end position of the closing element are limited and fixed. The front end position thereby corresponds for example to the filling position as shown in FIG. 1. A rear end stop position corresponds for example to a rear end position. However, a rear end position can also be located ahead of the rear end stop position on the guiding element, wherein the backward movement is limited for example by means of stopping a drive.

FIGS. 2A-D show the different positions of the axially movable filling tube 1.

Figure 2:
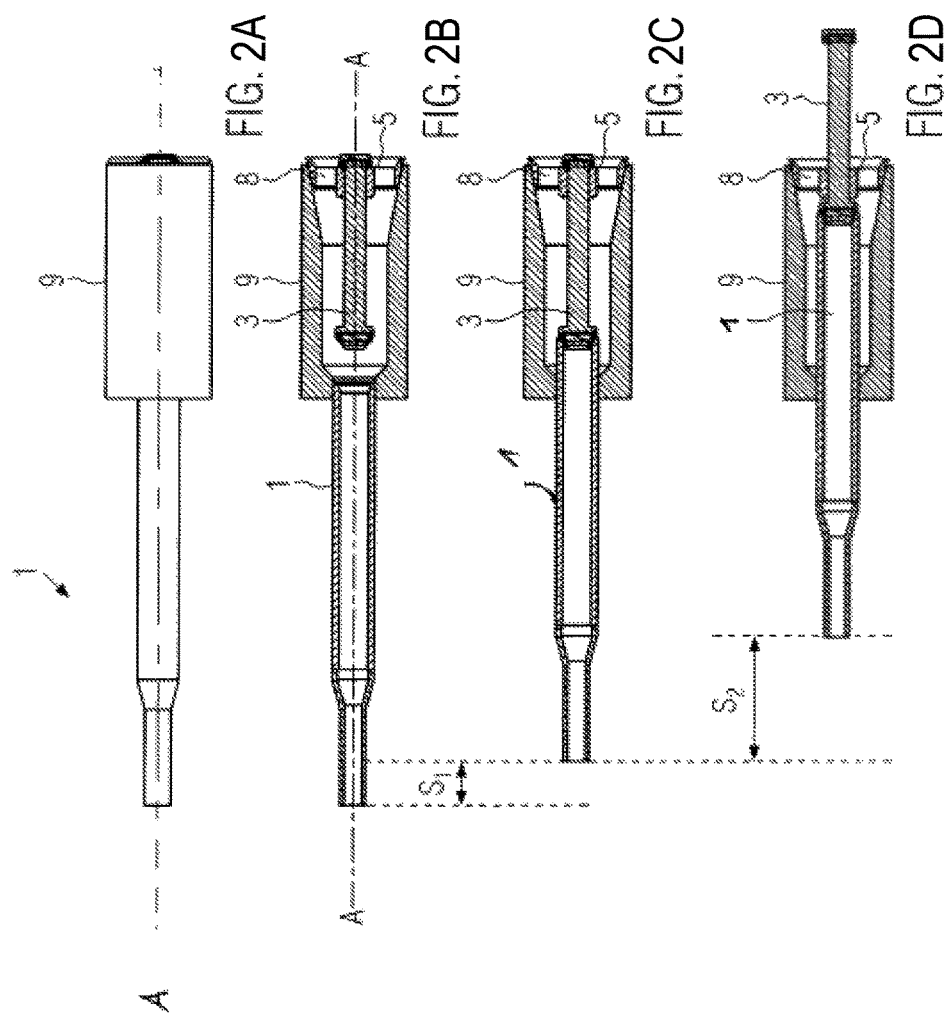
FIG. 2A shows a roughly schematic side view of a device according to the present disclosure in a filling position.
FIG. 2B shows a section through the device displayed in FIG. 2A in a filling position.
FIG. 2C shows the device displayed in FIG. 2B in a closing position.
FIG. 2D shows the device displayed in FIG. 2B and c in an end position.

FIG. 2A shows a side view of the device according to the present disclosure, wherein no conveyor system 7 is shown here for the sake of simplicity. FIG. 2B shows the filling tube in a front position, i.e. in a filling position in which filling material is conveyed from the conveyor system 7 through the opening 7a into the feeding device 7 and conveyed through the openings of the guiding element 8 past the closing element into the opening 2 of the filling pipe 1. The closing element 3 is also in a front filling position, e.g. end position. The rear area of the closing element 3 is held in this position by an end stop 5, here on the guiding element 8, e.g. the forward movement is limited.

If for example a new sausage sleeve should be put upon a filling tube, the filling process has to be ended, i.e. interrupted. The conveyor system 7 is stopped for this purpose. At the same time or immediately after, i.e. up to 0.2 s after switching off the conveyor system 7, the filling tube 1 is moved back in the axial direction A, i.e. in the direction of the conveyor system, by a path S1, as can be seen in FIG. 2C, by a drive that is not displayed.

Hence, the filling pipe 1 is moved back in the axial direction A as far as to ensure that the filling tube 1 hits the closing element 3 and that the opening 2 is closed in the process. A stable connection between the filling tube and the closing element 3 is ensured by an appropriate holding device 4, in this case a magnetic connection. As can be seen in FIG. 2C, the closing element 3 in this closing position is still in the same position as in FIG. 2B. According to at least one embodiment, the conveyor system can be driven in a backward direction immediately or shortly after having stopped the conveyor system 7 in order to suck remainders of filling material back out of the outlet 7s of the conveyor pump and the feeding device 9, e.g. until the axial backward movement is completed.

In this process, it is in particular advantageous for the closing element 3 to be fixed in its front position and held by means of a second holding device 6, here a magnetic holding device. Hence, the closing element can be prevented from being sucked back in the backsiphoning process of the conveyor system in a simple and efficient way. Apart from this, the second holding device 6 is also advantageous because the opening 2 can be closed safely if the tube 1 can be slid onto the closing element 3 under counterpressure. In this case, other holding devices such as mechanical holding devices, snap devices, clip devices etc. can also be used on the front end of the closing element 3 in addition or as an alternative to the magnetic device 4, where required. In the closing position as shown in FIG. 2C, the way for the pasty material into the filling tube is closed.

As shown in FIG. 2D, the filling tube 1 is subsequently moved further backwards into an end position by a path S2. This can for example be a position in which the extending front end of the closing element 3 hits an end stop 15, for example on the guiding element 8. The backward movement, however, can also take place simply by stopping and holding of the filling tube drive. The opening 2 remains closed during the movement of the filling tube 1 and the closing element 3. Hence, the filling tube 1 and the closing element 3 can move jointly in the axial direction A wherein the closing element 3 can be moved through the filling tube 1 so that no separate drive for the closing element is necessary. In the end position shown in FIG. 2D, for example the conveyor system 7 can still move backwards, e.g. until the enclosed filling material is pressure-less. In this end position as shown in FIG. 2D, for example a casing change can take place.

Subsequently, the filling tube 1 will be moved back out of the end position that is shown in FIG. 2D to the front into a filling position as shown in FIG. 2B. During the forward movement, the opening 2 opens after having moved the filling pipe 1 to the front by a path S2 as the closing element 3 is held in the position that is displayed in FIG. 2C, e.g. by the end stop 5 and the holding device 6, while the filling tube 1 can move further to the front. Hence, the holding device, in this case the magnetic connection between the holding device 4 on the closing element 3, can hence detach itself in a simple way. The filling tube 1 will then be brought further into the position shown in FIG. 2B. In this filling position, the filling process can continue, wherein the conveyor pump moves in a forward direction again and wherein the filling material is led again through the feeding device 9 and axially into the filling tube 1.

Figure 3:
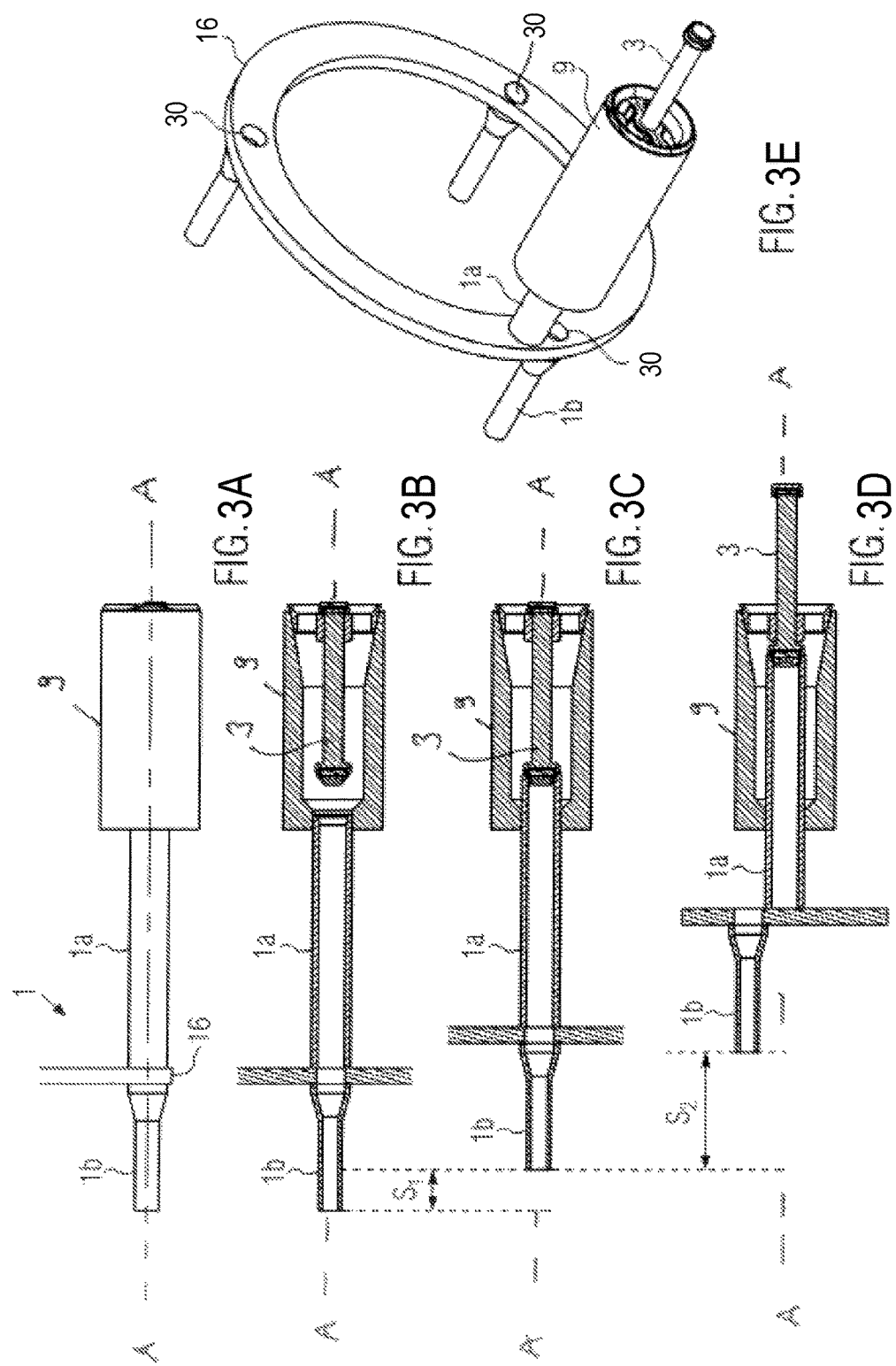
FIG. 3A shows a side view of a further embodiment according to the present disclosure in a filling position.
FIG. 3B shows a section through the device shown in FIG. 3A in a filling position.
FIG. 3C shows the device displayed in FIG. 3B in a closing position.
FIG. 3D shows the display shown in FIG. 3B and 3C in an end position.
FIG. 3E shows a schematic illustration of the device according to an embodiment of the present disclosure where filling tube sections are connected to one another via a rotatable disc.

FIGS. 3A-D essentially correspond to a further embodiment according to the present disclosure. FIGS. 3A-D essentially correspond to the FIGS. 2A-2D, wherein the filling tube is though composed of a filling material feed tube 1a and a front section of the filling tube 1b in this case. The two filling tube sections 1a, b are connected to one another via a rotatable disc 16 (see FIG. 3E). The filling tube section 1b is thereby connected firmly to the disc 16 on the side that faces away from the filling material feed tube 1a, whereas the filling material feed tube 1a sits on the surface of the disc 16 in a way that the disc 16 can move past the opening of the filling material tube and that it can either connect this opening to the filling tube section 1b by means of an opening 30 in the disc 16 or close it with the surface of the disc 16. As was explained in connection with FIGS. 2B, C and 2, the filling tube 1, which is composed of the sections 1a, 1b in this case, is moved backwards in the axial direction A into the end position (FIG. 3D) in this embodiment. In this end position, the filling tube section 1b can be disconnected from the filling material feeding tube section 1a, i.e. in this precise embodiment, the disc 16 that is installed rotatably is twisted in a way that the filling tube section 1b is moved away from the front opening of the filling material feeding tube section 1a with the respective opening 30 in the disc 16 in such a way that the front opening of the filling material feeding tube 1*a* is closed by the disc 16. This is in particular advantageous as no filling material remainders can now escape from the filling material feeding tube 1*a* towards the front. As can be seen in FIG. 3C, it is possible that multiple filling tube sections 1*b* are disposed on a disc 16, whereby the disc can be turned until a new filling tube 1*b* with a respective opening 30 fits on and aligns with the filling material feeding tube. For example a new sausage sleeve is put upon this new filling tube section 1*b*. Out of this end position as shown in FIG. 3D, the composed filling tube 1 can, if the new filling tube section 1*b* is connected to the filling material feeding tube 1*a*, be moved once again, as has been described in connection with FIG. 2A-2D, into the filling position displayed in FIG. 3B.

Figure 4:
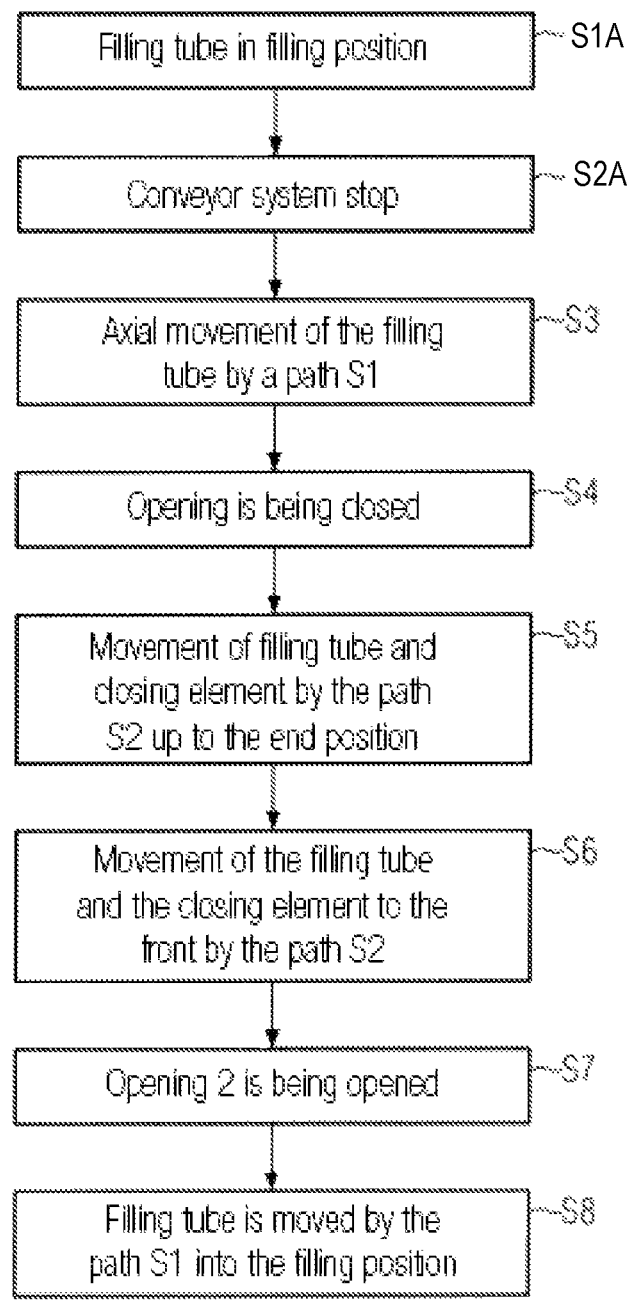
FIG. 4 shows a flow chart of a method according to the present disclosure.

Based on the flow chart shown in FIG. 4, the method according to the present disclosure will be explained once again in greater detail in the following. In step S1A, the filling tube is at first in a filling position as shown for example in the FIGS. 2A-2B, wherein the opening 2 of the filling tube 1 is open and while pasty material is filled through the opening 2 into the filling tube 1 during filling. When the filling process is ended or interrupted, the conveyor system 7 is stopped. A control device (not displayed) can for example transmit, simultaneously to the stop signal of the conveyor system, a signal to a drive of the filling tube 1, which emits a drive for movement of the filling tube towards the rear. The backward movement of the filling tube should take place at the same time as or immediately after stopping the conveyor system (e.g. no later than 0.2 s after the stop of the conveyor system).

The axial movement of the filling tube 1 by a path Si (see FIG. 2C, 3C) takes place in step S3. In this process, the opening 2 is closed in a step s4 by the axially arranged closing element 3. In a step S5 and as shown in FIG. 2D and 3D, the filling tube 1 and the closing element 3 move jointly into the end position by the path S2 while the opening 2 is closed.

The opening 2 remains closed by the holding device 4, in this case the magnetic holding device, during movement of the filling tube 1 and the closing element 3. In the end position of the filling tube and/or of the closing element 3 displayed in FIGS. 2D or 3D, a new sausage sleeve can now be put onto the filling tube 1 or the front section of the filling tube 1*b* can be replaced by a new filling tube section 1*b*, for example by means of turning the disc (see FIGS. 3D, 3E).

In a step S6, the filling tube 1 (or 1*b*, 1*a*) move jointly towards the front, i.e. in an opposite direction, wherein the opening 2 also remains closed over the holding device 4 in this process and wherein the filling tube 1 can pull the closing element 3 along towards the front. The filling tube 1 and closing element 3 are moved towards the front over a path S2, wherein the closing element 3 will then be stopped, here for example by the end stop 5 on the guiding element 8. Then, the filling tube 1 moves away from the closing element 3, the holding device 4 opens up and the opening 2 is opened in a step S7. Starting from the path S1, the filling tube is subsequently moved further towards the front over the path S1 in its initial filling position. Then, the conveyor system 7 can be operated again in a forward direction.

During the steps S2A to S5, the conveyor system can be operated in a backward direction in order to siphon back remainders of pasty material.

The invention claimed is:

1. A method for filling of sausage sleeves with pasty material through a filling tube, comprising:

feeding the pasty material into the filling tube through an opening on a rear end of the filling tube in an axial direction, and at an end of a filling process, moving the filling tube out of its filling position in the axial direction back onto an axially arranged closing element whereby the opening of the filling tube is closed.

2. The method according to claim 1, wherein moving the filling tube onto the closing element includes moving the filling tube over a first path, and wherein after having moved the filling tube over the first path onto the closing element, the filling tube and the closing element are moved together over a second path in the axial direction into an end position, wherein the second path is preferably ≥the first path.

3. The method according to claim 1, wherein the filling tube and the closing element are connected to one another by a holding device.

4. The method according to claim 3, wherein the holding device connects the filling tube and the closing element by a of magnetic force.

5. The method according to claim 1, further comprising, after having closed the opening of the filling tube, moving the filling tube back away from the closing element into a filling position.

6. The method of claim 5, wherein the closing element and the filling tube are moved jointly out of the end position in an opposite axial direction towards a front and, prior to the filling tube being arranged once again in the filling position, the opening of the filling tube is opened.

7. The method of claim 6, wherein the filling tube is opened after the filling tube is moved on a path that corresponds to a second path.

8. The method according to claim 1, wherein the closing element, after having been moved towards a front over a second path in the axial direction, is stopped.

9. The method of claim 8, wherein the closing element runs to an end stop.

10. The method according to claim 9, wherein the closing element is held at the end stop by a further holding device.

11. The method according to claim 10, wherein the further holding device holds the closing element by a of magnetic force.

12. The method according to claim 1, wherein the filling tube moves out of the filling position back in the axial direction when a conveyor system for feeding the filling tube is switched off, and wherein the conveyor system runs in a backward direction after the conveyor system for feeding the filling tube is switched off.

13. The method according to claim 1, wherein the closing element is led in a guiding system during its axial movement and moved by the filling tube and/or moved by a drive and/or by spring energy.

14. The method according to claim 1, wherein the filling tube comprises a filling material feeding tube as well as a disconnectable front section of the filling tube, wherein the front section of the filling tube is disconnected in the end position and the front opening of the filling material feeding tube is closed.

15. A device for filling of sausage sleeves with a pasty material, comprising:

a filling tube, which is arranged in an axially movable way, a feeding device through which the pasty material is fed axially into an opening on the rear end of the filling tube, and an axially arranged closing element in the opening is closed when the filling tube is moved onto the closing element.

16. The device according to claim 15, wherein the closing element is disposed in an axially movable way in the feeding device and is formed as an axially movable plunger whose front end closes the filling tube opening.

17. The device according to claim 15, wherein the filling tube and the closing element are moved jointly in an axial direction towards a rear into an end position.

18. The device according to claim 15, wherein the filling tube is connected to the closing element via a holding device, including via a magnetic holding device.

19. The device according to claim 15, wherein the axial movement of the closing element towards a front in a transport direction of the pasty material, is limited by a first stop device including an end stop, and wherein the closing element is held in an end stop position by a further holding device that is a magnetic holding device.

20. The device according to claim 15, wherein the feeding device is connected to an outlet of a conveyor system.

* * * * *